United States Patent [19]

Krings et al.

[11] Patent Number: 5,275,445
[45] Date of Patent: Jan. 4, 1994

[54] GAS-TIGHT PIPE CONNECTION

[75] Inventors: Rainer Krings, Düsseldorf; Friedrich Lenze; Erwin Langer, both of Ratingen, all of Fed. Rep. of Germany

[73] Assignee: Mannesmann Aktiengesellschaft, Corp of Germany, Dusseldorf, Fed. Rep. of Germany

[21] Appl. No.: 902,136

[22] Filed: Jun. 22, 1992

[30] Foreign Application Priority Data

Jun. 21, 1991 [DE] Fed. Rep. of Germany ....... 4120998

[51] Int. Cl.$^5$ ............................................. F16L 35/00
[52] U.S. Cl. ..................... 285/93; 285/333; 285/383; 285/39
[58] Field of Search ................... 285/93, 14, 333, 334, 285/355, 917, 383, 39; 277/2

[56] References Cited

U.S. PATENT DOCUMENTS

| | | | |
|---|---|---|---|
| 3,214,198 | 10/1965 | Peuchmaur | 285/355 X |
| 3,521,910 | 7/1970 | Callahan et al. | 285/14 |
| 4,455,040 | 6/1984 | Shinn | 285/93 |
| 4,572,549 | 2/1986 | Sidwell | 285/333 X |
| 4,913,464 | 4/1990 | Taylor et al. | 285/93 X |
| 4,984,829 | 1/1991 | Saigo et al. | 285/334 |
| 5,048,873 | 9/1991 | Allread et al. | 285/93 X |

*Primary Examiner*—Dave W. Arola
*Attorney, Agent, or Firm*—Cohen, Pontani, Lieberman, Pavane

[57] ABSTRACT

A gas-tight pipe connection includes a sleeve which has two internal thread portions which extend from the ends of the sleeve to a thread-free portion located in the middle of the sleeve. The sleeve includes a radially inwardly projecting web located in the middle of the thread-free portion and extending over a certain width. The web has end faces constructed as contact shoulders. A sealing portion each is provided between the internal thread portions and the contact shoulders. The connection further includes two pipes, each of which has in an end portion thereof a threaded portion constructed complementary to the internal thread portion of the sleeve. Each pipe also has a contact shoulder and a sealing surface arranged between the contact shoulder and the threaded portion. A tight metal seat is formed between the sealing surface of the pipe and the sealing portion of the sleeve. The sleeve is provided with an opening extending through the wall of the sleeve in each area of the thread-free portion between the tight metal seat and the internal thread portion. The openings make it possible to reproducibly test the gas-tightness of the pipe connection within less than 60 seconds.

1 Claim, 3 Drawing Sheets

GAS-TIGHT PIPE CONNECTION

BACKGROUND OF THE INVENTION

1. Field of the Invention

The present invention relates to a gas-tight pipe connection. The pipe connection includes a sleeve which has two internal thread portions which extend from the ends of the sleeve to a thread-free portion located in the middle of the sleeve. The sleeve further includes a radially inwardly projecting web located in the middle of the thread-free portion and extending over a certain width. The web has end faces constructed as contact shoulders. A sealing portion each is provided between the internal thread portions and the contact shoulders. The connection includes two pipes, each of which has in the end portion thereof a threaded portion constructed complementary to the internal thread portion of the sleeve. Each pipe also has a contact shoulder and a sealing surface arranged between the contact shoulder and the threaded portion.

2. Description of the Related Art

A pipe connection of a pipeline for use in the crude oil and natural gas industry composed of threaded pipes which can be screwed together has the purpose, on the one hand, to absorb the load in the line and, on the other hand, to secure the tightness of the connection. In order to meet this object, the threaded portions of the pipe ends and of the sleeve may have, for example, a conical API thread with an appropriate overlap. Because of the overlap of the thread, high surface pressures occur during screwing together of the pipes and the sleeve. In order to handle these high pressures, surface coatings and greases have been developed which make it possible that the components can be screwed together without jamming. These thread greases are spreadable pastes having a high proportion of finely distributed solid particles, such as graphite, metals, or teflon. In addition to ensuring a problem-free screwing together of the components, the greases also reinforce the hydraulic tightness in the areas of the threads of the connection, wherein the connection acts as a labyrinth-type seal.

In gas-tight pipe connections developed by various manufacturers, the tightness of the connection is usually obtained by a high contact pressure due to an overlap in the tight metal seat.

The contact shoulders serve as a stop means for the screw connection and ensure that the tight metal seat remains activated even when the load acting on the pipeline increases. Consequently, the conical thread does not have to perform a sealing function and, contrary to API round threads or buttress threads, only has the purpose to transmit the load in the pipeline. In the past, in order to reliably screw together the connections in the regions of the threads and the tight seat, surface coatings and lubricating pastes with solids were also used in these pipe connections in order to eliminate jamming and to ensure that the screw connections can be used again. The use of lubricating pastes with solids or screw greases in gas-tight connections with conical threaded portions has the substantial disadvantage that a high temporary sealing effect is created in the threaded portions which does not permit a test of the tightness of only the tight metal seat.

When a gas-tight connection is tested with respect to tightness after having been screwed together, the temporary sealing behavior of the threaded portions has the consequence that the test result does not provide a secure statement with respect to the tightness of the metal seal, even though the leakage test methods which have been utilized are capable of detecting leakage rates of less than 1 liter per year and the test pressures are in the range of the minimum internal pressure strength of the pipe or the pipe connection. Particularly in the case of low test pressures, the test period of 1 to 3 minutes which is available on the site is entirely insufficient for safely overcoming the temporary sealing effect generated by the screw grease. Therefore, as appropriate tests have shown, a gas tightness is very often only simulated when screw greases are used. These tests have further shown that the pseudo-tightness or false tightness increases with increasing pipe diameter because of the increased thread resistance and because of the usually additionally increased length of the thread. In addition, in larger pipes, i.e., pipes having an outer diameter of more than 7 inches and small wall thicknesses or small s/d ratios, wherein s is the wall thickness and d is the inner diameter, the test pressures used during the leakage test cannot be as high as compared to the pressures used in small pipes. Since the time during which the test gas passes along the length of the thread is essentially dependent on the pressure, it must be expected in larger pipes that the proportion of pseudo-tight connections increases.

One of the available possibilities for overcoming this problem is to significantly reduce the temporary sealing capability of the thread, for example, by using a low-viscosity oil, for example, slide track oil, as the lubricant instead of a high viscosity API grease, see German Patent 391 33 14. Contrary to the use of an API grease as the lubricant when the pipes are screwed together, the test gas used during the tightness test can penetrate within a short time through the oil film entrapped in the threads and can be detected if the tight metal seat should be leaking. However, this method can also not be used if the test pressure must be reduced to below 300 bar because the pipes have large diameters, thin walls, and a low material quality. Under these conditions, the time required for the test gas to flow through is increased even when a low viscosity oil is used to such an extent that the time exceeds conventional test periods. This means that, even when a slide track oil is used, it is possible that a pseudo-tightness is simulated, even if substantially longer test periods than are usual are employed. This would mean an additional unacceptable extension of the assembly times because of costs and the minimizing of danger.

SUMMARY OF THE INVENTION

Therefore, it is the object of the present invention to provide a gas-tight pipe connection whose tightness can be safely tested repeatedly within a test time of less than 60 seconds.

In accordance with the present invention, the above object is met by providing the sleeve with an opening extending through the wall of the sleeve in each area of the thread-free portion between the tight metal seat and the internal thread portion.

By providing the openings in the areas indicated above, the threaded portions are bridged as possible additional seals. In other words, if one of the two tight metal seats should be leaking, the test gas can flow within a very short time from the inside to the outside through the opening without taking the detour through the threads and can be detected immediately.

In order to ensure that the opening does not negatively influence the region of the tight seat and of the threads, it is proposed in accordance with the present invention that the opening ends on the inside of the sleeve in a groove at the inner end of the thread. This location is not critical because neither the thread nor the sensitive tight seat area of the sleeve are influenced.

In principle, the opening does not have to be closed after a successful leakage test, because the tightness of the two tight metal seats has been determined previously. However, there may be external conditions which make it advisable to close the opening. This will be the case if the external pressure reaches values which negatively influence the stress conditions in the tight seat area or if corrosion-increasing media can have access to the space immediately in front of the tight metal seat.

As a first simple solution for closing the opening, the present invention proposes to construct the opening as a cylindrical bore and to drive an appropriate pin having a greater diameter into the bore. However, this proposal has the disadvantage that, after pulling out the pipeline and when screwing the connection together again, the leakage test cannot be easily carried out again at the side which has not been unscrewed.

Therefore, in order to make it possible to repeat the leakage test, a further development of the present invention proposes to provide the bore with a threaded portion and to screw a threaded pin into the bore in a gas-tight manner. The gas-tightness could be ensured, for example, by an appropriately applied sealing agent when the pin is screwed in.

In accordance with another feature of the invention, the bore has a thread-free portion and an adjacent increasing diameter portion. This increasing diameter portion is constructed as a sealing surface, so that a tight seat is formed when the threaded pin is screwed in between the increasing diameter portion and the tip of the threaded pin which is essentially conical. In accordance with another proposal, the tip of the pin has a spherically shaped indentation and a sealing ball is pressed into the indentation.

The use of the gas-tight pipe connection according to the present invention is not limited to pipes having a small s/d ratio and low material qualities. Rather, the pipe connection according to the invention is also advantageous for small dimensions. In this case, the use of slide track oil would not be necessary. This would have the advantage that it would not be necessary to store this oil separately and additionally on the assembly site, because API greases which have already been found useful could be used. In the case of the use of high-alloy austenitic materials, this type of pipe connection would also be advantageous because, even when a coating is applied to prevent jamming, these types of materials limit the capability of screwing the pipes together repeatedly when slide track oil is used. It is always necessary in this situation to use appropriate greases which could produce a temporary tightness in the threads.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DESCRIPTION OF THE PRESENTLY PREFERRED EMBODIMENTS

Figure 1:
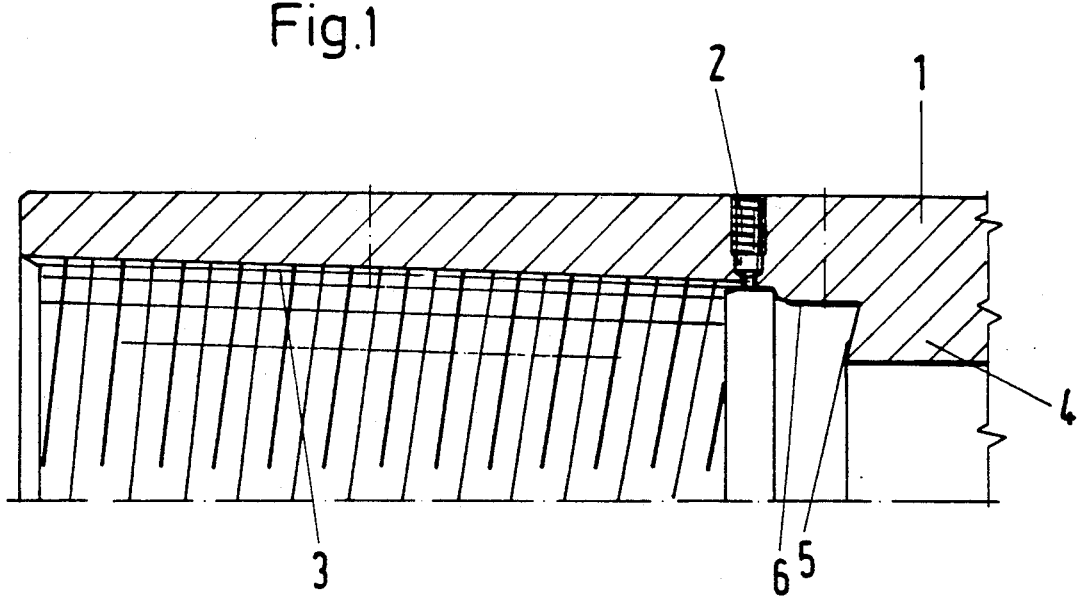
FIG. 1 is a partial longitudinal sectional view of a sleeve half of a pipe connection according to the present invention.
Figure 2:
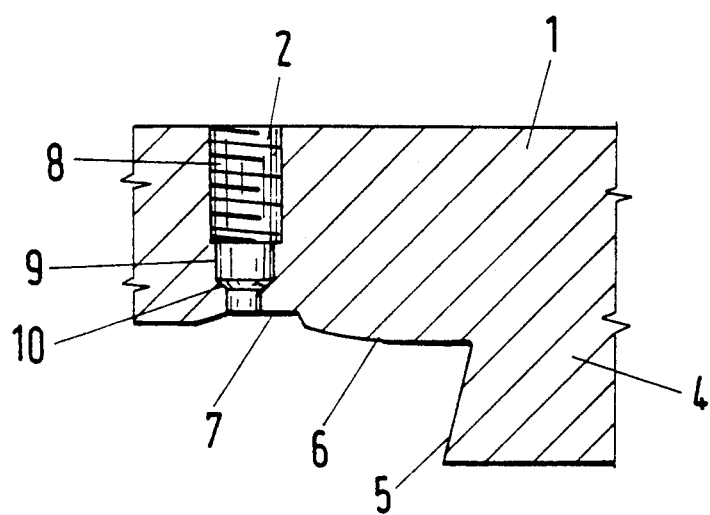
FIG. 2 is a partial sectional view, on a larger scale, of a detail of the pipe connection of FIG. 1 showing an opening in the sleeve.

FIGS. 1 and 2 of the drawing show in a longitudinal sectional view a portion of half a sleeve 1. An opening provided in accordance with the present invention is denoted by reference numeral 2. The sleeve 1 has an internal thread portion 3 which extends from an end of the sleeve 1 to a thread-free portion located in the middle of the sleeve. In the illustrated embodiment, the thread of the internal thread portion 3 is conical. An end face of a radially inwardly projecting web 4 located in the middle of the thread-free portion is constructed as a contact shoulder 5. In the illustrated embodiment, the contact shoulder 5 includes an angle of 15° with the vertical. A circumferentially acting tight seat portion 6 of the sleeve 1 extends from the contact shoulder 5 toward the end of the sleeve 1. A transition portion is arranged adjacent the tight seat portion 3. In the illustrated embodiment, the transition portion is a groove 7. This groove 7 is required for providing space for the cutting tool which cuts the internal thread portion 3.

The area of the groove 7 is selected as the location where the opening 2 which extends through the wall of the sleeve 1 ends at the inside of the sleeve 1. This location provides the advantage that the opening 2 does not in any way impair the operation of the internal thread portion 3 or of the sensitive tight seat portion 6.

To make it possible that the opening 2 can be closed in a gas-tight manner after a leakage test, the opening 2 of the embodiment of FIGS. 1 and 2 has a threaded portion 8 and a thread-free portion 9. The diameter of the thread-free portion 9 has a step, so that an increasing diameter location 10 is obtained which is constructed as a tight seat surface.

Figure 3:
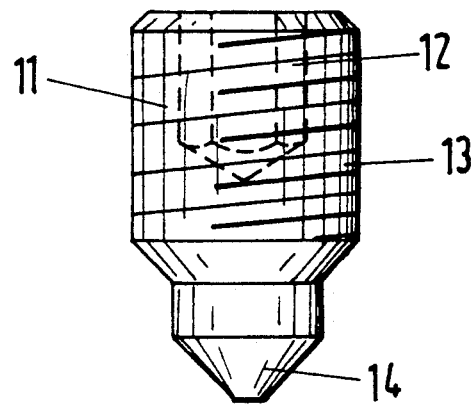
FIG. 3 is a sectional view of a threaded pin with conical tip.

A threaded pin 11 which can be screwed into the opening or bore 2 is illustrated in FIG. 3. The pin 11 has a hexagonal recess 12 for receiving a wrench. The head portion of the pin 11 has a thread 13. The tip 14 of the pin 11 is constructed conically and interacts with the tight seat surface 10 of the opening 2.

Figure 4:
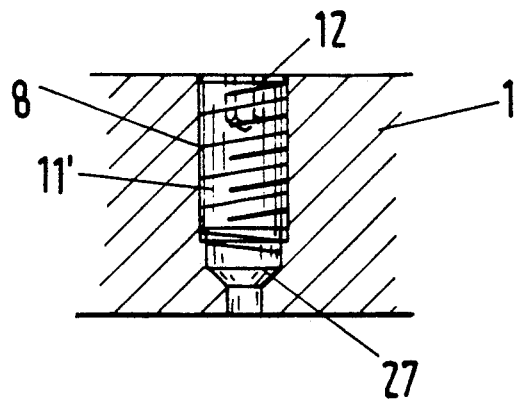
FIG. 4 is a sectional view of a threaded pin with a thread-free cylindrical portion in the screwed-in state.

FIG. 4 of the drawing shows another embodiment of a threaded pin 11' in the screwed-in state, wherein a cylindrical thread-free portion forms a tight seat with the conically constructed increasing diameter portion 14.

Figure 5:
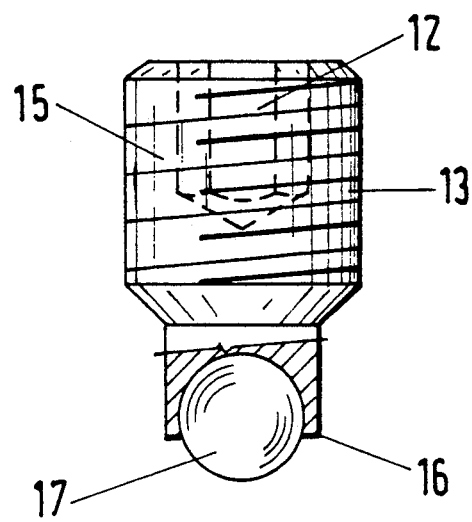
FIG. 5 is a sectional view of a threaded pin with a moveable sealing ball mounted in the pin.

FIG. 5 of the drawing shows another embodiment of a threaded pin 15. This threaded pin 15 also has a hexagonal recess 12 and a thread 13. The tip of the pin 15 is constructed with a spherical indentation 16 and includes a moveable sealing ball 17.

Figure 6:
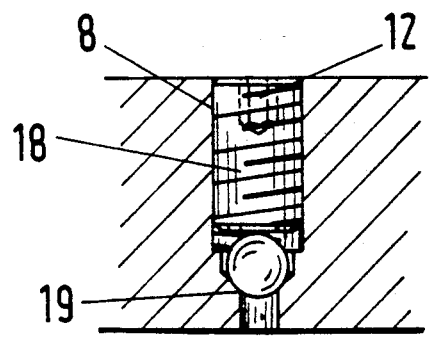
FIG. 6 is a sectional view of a threaded pin with a separate ball in the screwed-in state.

FIG. 6 shows a threaded pin 18 in the screwed-in state similar to the arrangement of FIG. 5. The threaded pin 18 has a plane tip and presses against a separate sealing ball 19.

Figure 7:
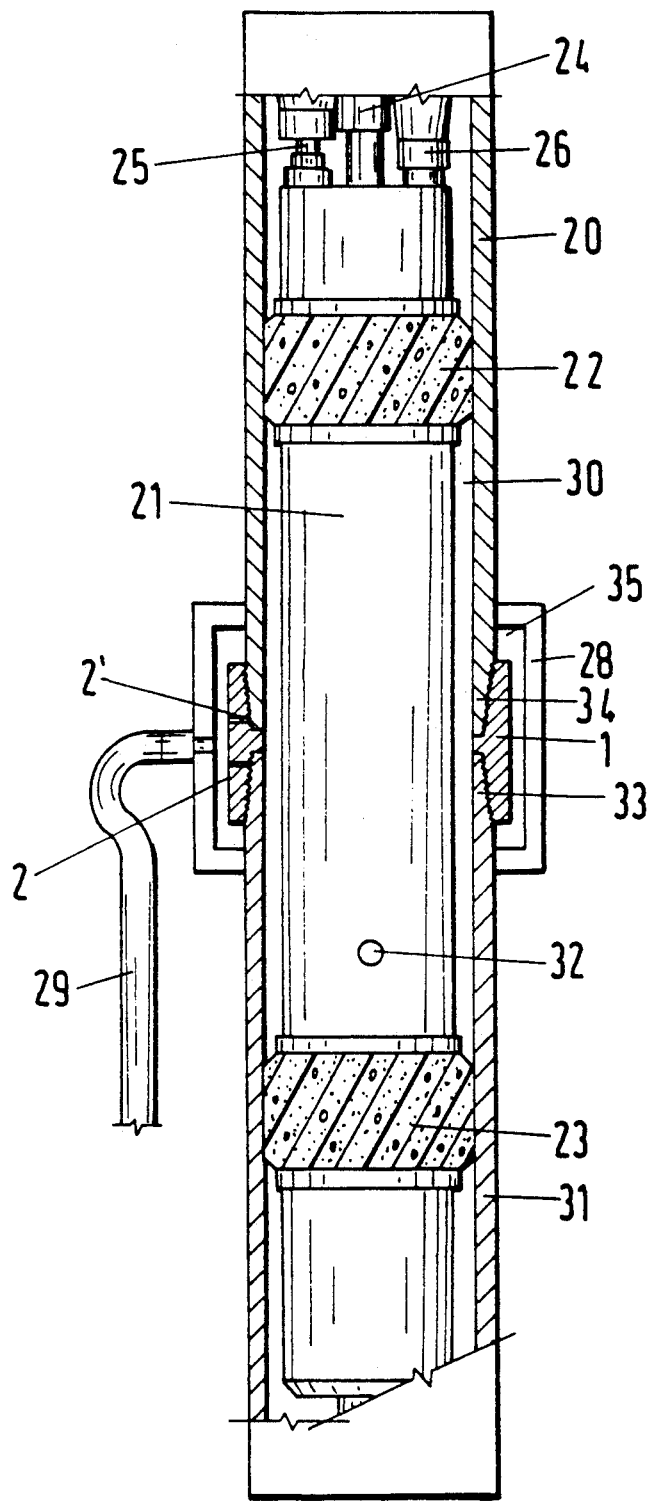
FIG. 7 is a longitudinal sectional view of an arrangement for carrying out a gas-tightness test.

FIG. 7 of the drawing is a longitudinal sectional view showing an arrangement for carrying out a gas-tightness test. After the pipe connection has been screwed together, a test mandrel 21 is inserted through pipe 20 which is screwed into the sleeve 1. The test mandrel 21 has two spaced-apart packing elements 22, 23. The test mandrel 21 is connected at its upper end to a wire rope 24 and a flexible hydraulic line 25 for placing the packing elements 22, 23 and to a test gas line 26. A gas detection line 29 which is connected to a detector, not shown, for example, a gas chromatograph, may be connected in the conventional manner to a divided enclosing pipe 28, which is placed around the pipe connection. However, it is more advantageous to connect the gas detection line 29 directly to the detection openings 2 or 2' of the sleeve 1. As a result, in the case of a leakage, it is possible to determine directly whether the leak is on the upper side of the pipe connection which is screwed together on the site, or on the lower side of the connection which is screwed together at the factory. In order to enable the supplied test gas to flow into the annular space 30 which is formed by the outer surface of the test mandrel 21 between the packing elements 22, 23 and the inner surface of the pipes 20, 31, the test mandrel 21 has at least one or more openings 32.

In accordance with the invention, the sleeve 1 which connects the two pipes 20, 31 has openings 2 and 2' which extend through the wall of the sleeve 1. The ends of the pipes 20, 31 are constructed as journals 33, 34.

The test procedure is carried out as follows:

The annular space 30 is pressurized by means of the supplied test gas, for example, to standardized test pressures, wherein the hydraulic packing elements 22, 23 ensure that the test space is properly sealed. If the pipe connection is untight in the region of one of the tight metal seats or both tight metal seats, the test gas flows through the opening 2 or opening 2' or both openings into the annular space 35 formed by the enclosing pipe 28 and the outer surface of the pipe connection. The test gas is then conducted through the detection line 29 to a detector which triggers an appropriate indication. In accordance with a more elegant solution, the test gas flows directly through the opening 2 or 2' into the detection line 29 without the use of the enclosing pipe 28.

After carrying out a successful leakage test, the openings 2, 2' are closed by means of a threaded pin during or after the removal of the test arrangement. As mentioned above, the threaded pin may be a threaded pin 11 with a conical tip 14, as shown in FIG. 3.

The sleeve 1 according to the present invention provides the advantage that even with a low test pressure a leakage of the tight metal seats can be safely detected independently of the length of the threads and the lubricant used in the connection within a short test period of, for example, 30 seconds or less.

It should be understood that the preferred embodiments and examples described are for illustrative purposes only and are not to be construed as limiting the scope of the present invention which is properly delineated only in the appended claims.

We claim:

1. A gas-tight pipe connection comprising a sleeve and two pipes having ends, the ends of the pipes being connected to the sleeve, the sleeve having a wall, an axis, and a middle, the sleeve having in the middle thereof an internal thread-free portion, the sleeve further having two internal thread portions, each internal thread portion extending from an end of the sleeve to the thread-free portion, a radially inwardly projecting web having a width in the axial direction and being located in the middle of the thread-free portion, the web having radial end faces extending in circumferential direction of the sleeve, the thread-free portion having a sealing portion extending between each radial end face and the internal thread portion, the end of each pipe having a threaded portion which complements the internal thread portion of the sleeve and a contact shoulder, a sealing face extending between the contact shoulder and the threaded portion, a tight metal seat forming a seal being formed between the sealing portion of the sleeve and the sealing surface of the pipe, and radial bores extending through the wall of the sleeve at portions of the thread-free portion of the sleeve located between the tight metal seat and the internal thread portions, the bores extending into the interior of the sleeve and ending on the inside of the wall of the sleeve in areas adjacent the ends of the internal thread portions of the sleeve, each bore having a thread-free portion with an increasing diameter portion forming a tight-seat surface, further comprising a threaded pin screwed into each bore, the threaded pin having a thread-free tip with a spherical indentation, and a sealing ball mounted in the thread-free portion of the bore, such that, when the threaded pin is screwed into the bore, the spherical indentation of the threaded pin presses the sealing ball against the tight-seat surface.

* * * * *